Patented Nov. 15, 1927.

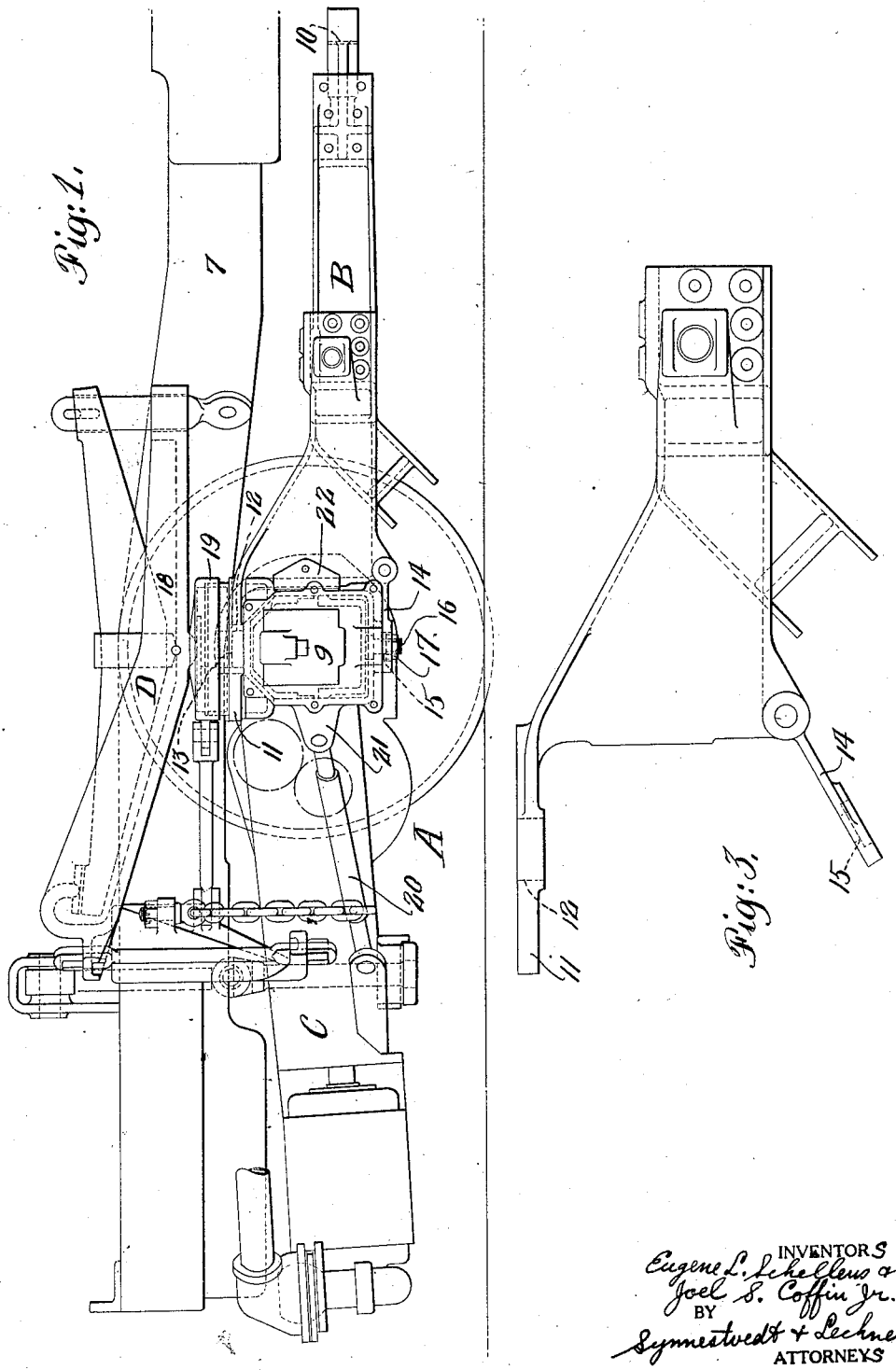

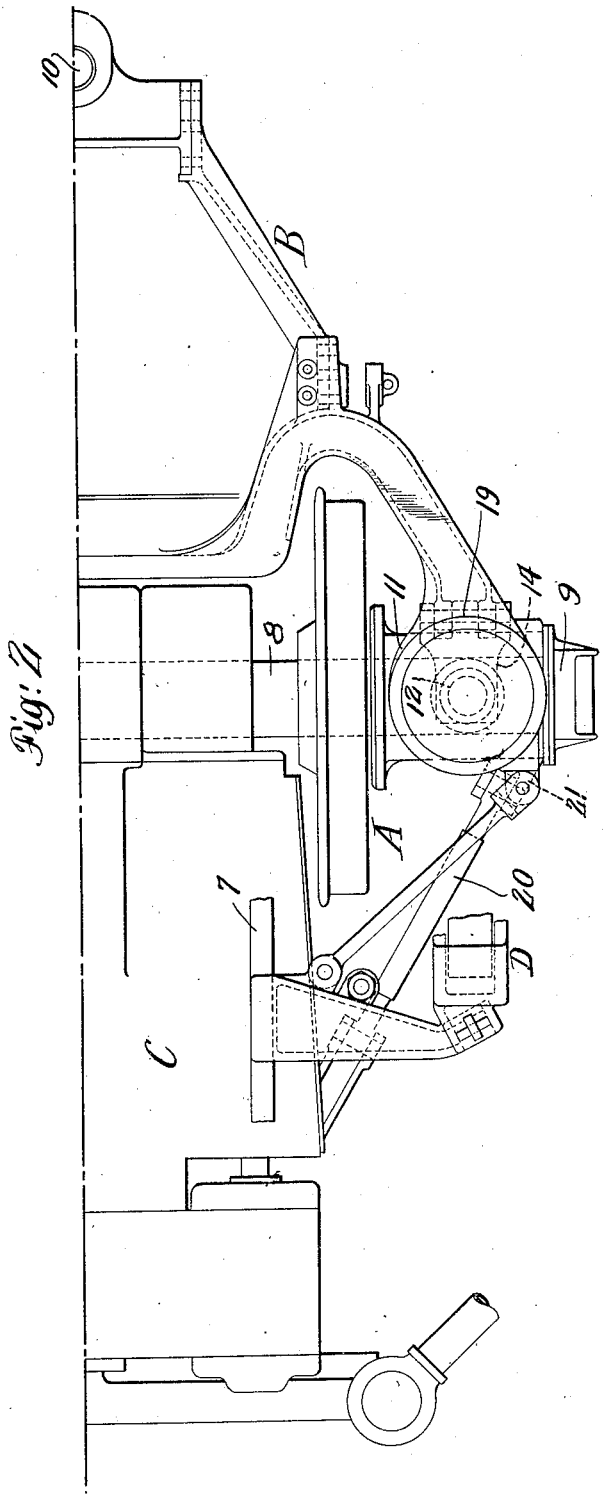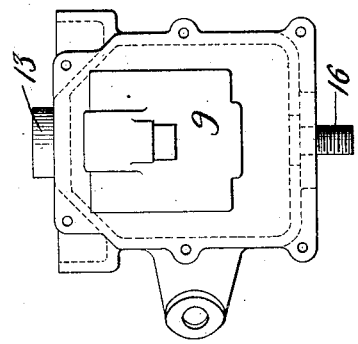

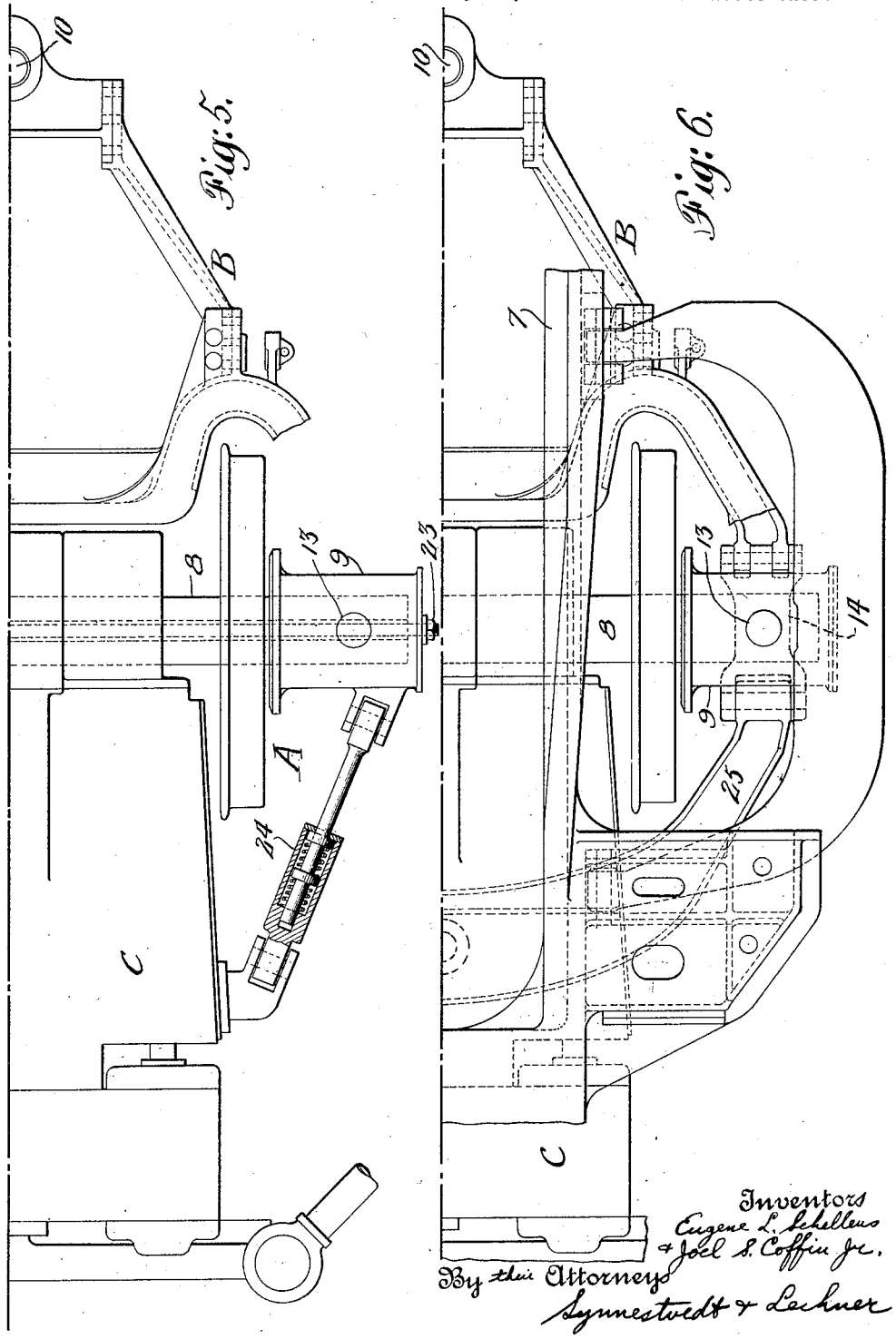

1,648,964

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

TRUCK.

Application filed July 23, 1925. Serial No. 45,496.

This invention relates to trucks and is particularly useful in connection with trailing trucks of locomotives in connection with which it will be described.

One of the primary objects of our invention is to increase the accessibility of the truck; to make it easy to remove the axle and wheels; and to simplify the renewal of hub liners and the like.

The invention is especially adapted to trailer trucks provided with booster motor devices and in this connection it is one of the primary objects of the invention to make the booster motor readily accessible, easily removable and easily replaceable. Our invention also involves the simplification of the truck and its reduction in weight.

The foregoing, together with such other objects as may hereinafter appear, or are incident to our invention, is realized by the construction we have illustrated in preferred form in the accompanying drawings, wherein Fig. 1 is a side elevation of a booster equipped trailer truck embodying our invention;

Fig. 2 is a half plan view of Fig. 1;

Fig. 3 is an enlarged side elevation illustrating certain details of our invention;

Fig. 4 is an enlarged end elevation of the improved journal box used in practicing our invention; and Figs. 5 and 6 are views corresponding to Fig. 2 but illustrating modifications of our invention.

Referring now to Fig. 1, reference numeral 7 indicates the rear end of the main frame of the locomotive, to which the truck, indicated as a whole by the reference letter A, is adapted to be pivoted. The truck has a frame B, this frame being open at the rear, that is to say, the side members terminate in the region of the axle 8. The axle has journal boxes 9, such journals being carried in the open ended frame B as will hereinafter appear.

The axle carries the forward end of the booster motor device C, such motor being adapted to drive such axle thru gearing in a manner now well understood in this art.

The frame B is pivoted at 10 for radial movement.

Referring now to the manner in which the journal boxes 9 are carried by the open frame B, it will be seen that such frame has overhanging rearwardly extending top plates 11, having a hole 12 in the center thereof. The journal box 9 has a boss 13 projecting from the upper part thereof adapted to fit into the opening 12 in the plate 11. Hinged to the bottom of the rear end of the frame at each side, is a plate 14 having an aperture 15 adapted to fit over the threaded boss 16 on the bottom of a journal box, when the plate is swung upwardly. A nut 17 is adapted to draw up the hinged plate 14 to operative position. The journals are thus trunnioned to the ends of the open frame on a vertical axis. The weight of the super-structure, carried by the truck, is transmitted thru the springs and spring rigging D, preferably after the manner illustrated in our pending application, Serial No. 702,730, filed March 29, 1924, the spring supports 18 being adapted to bear upon the top plates 11 of the frame thru the medium of the shoes 19.

Since the load is upon the upper ends of the journal boxes, the hinged plates 14 serve only to hold the boxes as against thrusts endwise of the truck.

The ends of the frame, or more properly speaking, the journal boxes are tied and supported by the tie bars 20 secured to the ears 21 of the journal boxes and to the booster. These tie bars at one and the same time serve to properly position the booster motor with reference to the truck and the axle and to tie the journal boxes.

This arrangement, altho simple and light, nevertheless has the necessary strength to withstand the thrust imposed under service conditions. It will be seen that to remove the boxes it is only necessary to block the weight on the springs and to put a wedge under the driving wheels. The nut 17 can then be removed, allowing the plates 14 to swing downwardly, whereupon the boxes may be readily disengaged and the booster and the axle can be rolled out. This, of course, renders the booster motor readily accessible and easily repaired, besides which hub liners can be quickly renewed. The journal boxes are selfaligning so that wear does not take place rapidly. It is possible to even turn down the journals with a portable crank pin turning machine. As compared to the ordinary practice of dropping the wheels and to the ordinary methods of removing the booster, it is possible by our invention to do these very expeditiously and simply.

The thrust due to the booster is taken by the pads 22 so as to relieve the trunnions. These pads are renewable.

In the arrangement shown in Fig. 5, the journals are tied together by a thru tie rod 23, such as shown and described in our pending application, Serial No. 30,435, filed May 15, 1925, now Patent No. 1,621,606. Where such a tie is provided, a yielding booster supporting means, such as indicated at 24, may be substituted for the bars 20.

In accordance with the arrangement of Fig. 6, a yoke 25 is adapted to be hinged to the rear ends of the hinge plates 14, such yoke serving to tie the journals and position the booster with respect to the axle and truck.

We claim:

1. In a railway truck, a frame and journal boxes trunnioned therein, together with tie means between the journal boxes.

2. In a railway truck, a frame and journal boxes trunnioned therein on a vertical axis, together with tie means between the journal boxes.

3. In a railway truck, a frame having horizontal jaws, one of which is hinged, and a journal box carried between the jaws with freedom for shifting movement.

4. In a railway truck, a frame having horizontal jaws, one of which is hinged, and a journal box carried between the jaws and trunnioned therein.

5. In a railway truck, an open frame having a pair of horizontal jaws at the end of each side member thereof and a journal box in each pair of jaws, together with tie means between the journal boxes.

6. In a railway truck, an open frame having a pair of horizontal jaws at the end of each side member thereof and a journal box in each pair of jaws, an axle journaled in the boxes, a booster motor for driving the axle, and a combined journal box tie means and lateral support for the booster motor.

7. In a railway truck, an open frame having a pair of horizontal jaws at the end of each side member thereof and a journal box in each pair of jaws, an axle journaled in the boxes, a booster motor for driving the axle and a combined booster motor lateral supporting and journal box tying means, the booster motor, axle and boxes being removable as a unit.

8. In a railway truck, a frame, an axle and journal boxes for the axle trunnioned in the frame on a vertical axis and removable therefrom without dropping the axle and its wheels.

9. In combination with a locomotive main frame, trailing axle boxes, booster motor and a booster motor lateral supporting means including a connecting member between said booster motor and said trailing axle boxes.

10. In a railway truck, an open-ended frame, journal boxes trunnioned therein, and tie means between the boxes.

11. In a railway truck, a frame, journal boxes mounted therein, an axle journalled in the boxes, a booster motor to drive said axle, and tie means between the boxes including the booster motor.

12. In a railway truck, a frame having horizontal jaws, one of which is hinged, a journal box carried between the jaws, and a thrust transmitting member between the frame and the box.

In testimony whereof, we have hereunto signed our names.

EUGENE L. SCHELLENS.
J. S. COFFIN, Jr.